United States Patent Office 3,225,850
Patented Dec. 28, 1965

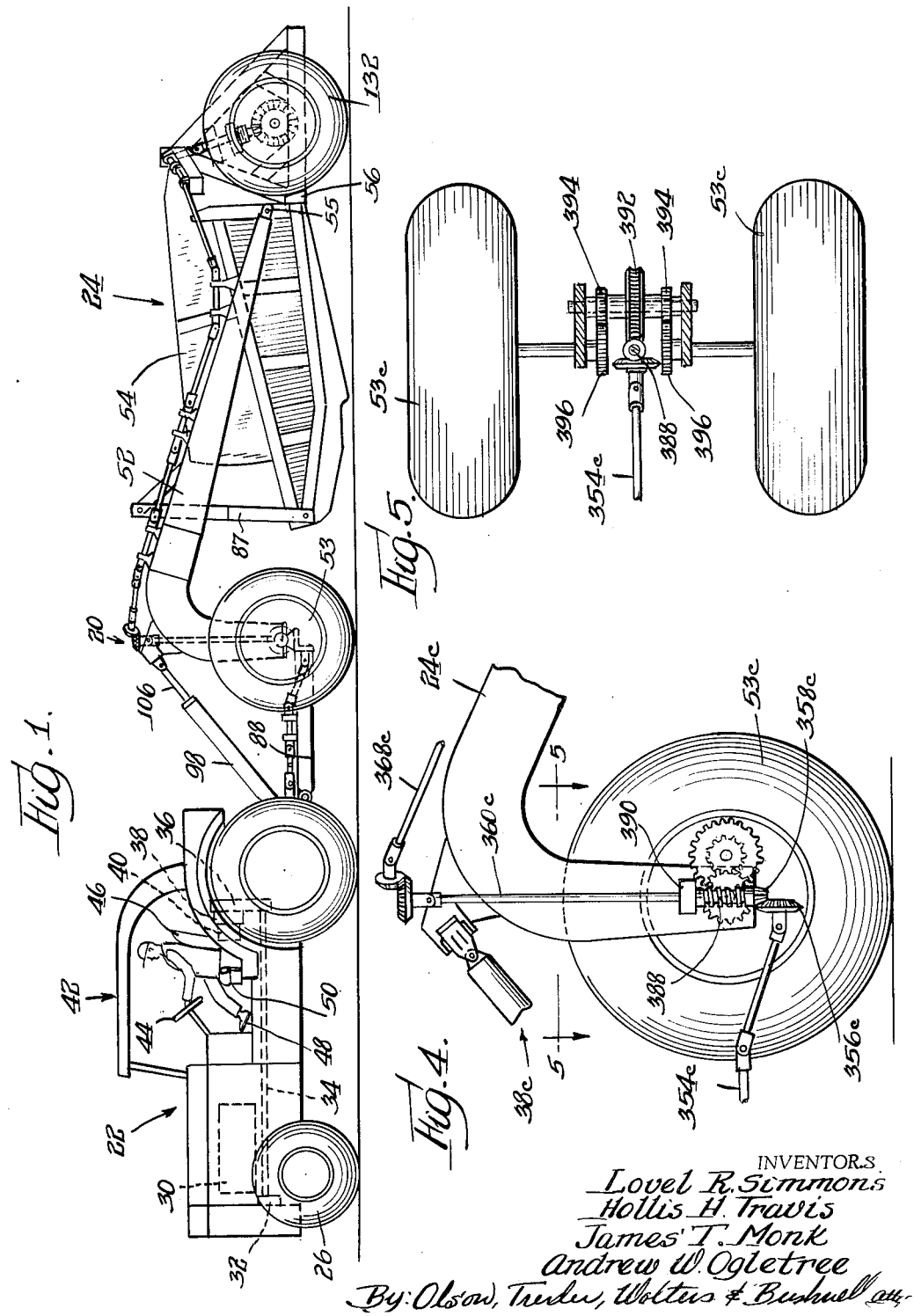

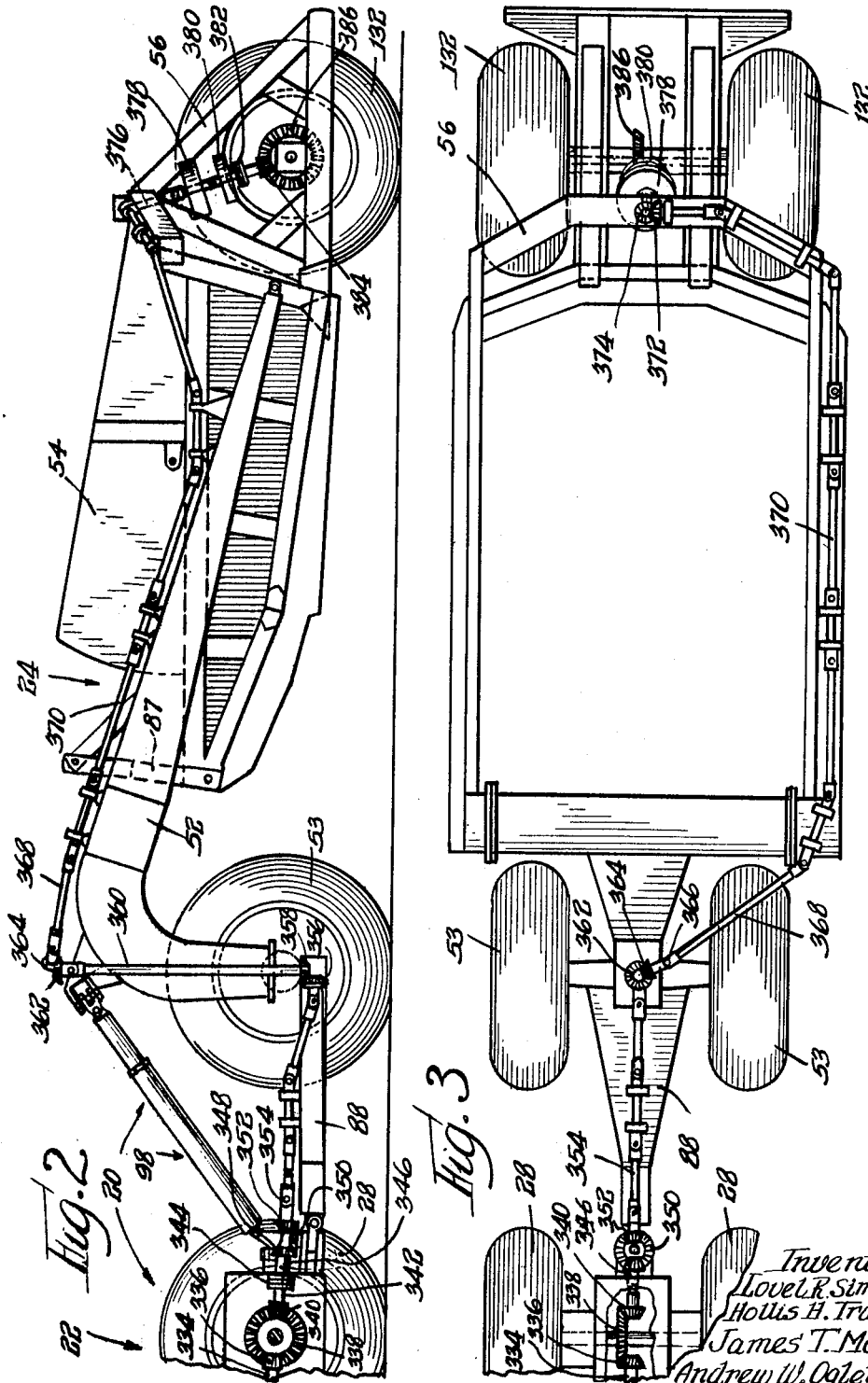

3,225,850
TRACTION FOR EARTH MOVERS AND THE LIKE
Lovel R. Simmons, Jackson, Miss., Hollis H. Travis, Dallas, Tex., and James T. Monk, Louisville, and Andrew W. Ogletree, Clinton, Miss., assignors to M-R-S Manufacturing Company, Flora, Miss., a corporation of Delaware
Original application May 27, 1960, Ser. No. 32,195. Divided and this application June 5, 1964, Ser. No. 372,936
5 Claims. (Cl. 180—14)

This invention is concerned with the movement of earth, coal, and the like, and is particularly concerned with improved traction for earth movers.

This application comprises a division of our application Serial No. 32,195 filed May 27, 1960, for "Improved Traction for Earth Movers and the Like."

In order to move dirt and the like economically, it is necessary to carry very large loads. Although good highways or haul roads produce no particular problems, such loads must often be carried over terrain providing very poor traction, and often uphill over quite substantial grades, as from a borrow pit. Frequently material which is inherently of poor traction is combined with uphill movement.

There are three recognized types of rubber tired earth movers, respectively having two axles, three axles, and four or more axles. Each such earth mover or unit includes a trailer or semi-trailer, which may be provided with a blade or plate at the lower front end thereof to scrape dirt up for hauling in a bowl or hopper immediately to the rear of the blade or plate. The device then is frequently known as a scraper.

The two axle unit comprises a tractor having a single axle, and a semi-trailer having a single axle at the rear end and supported at the front on the tractor. The semi-trailer has a gooseneck arrangement at the front in order to clear the wheels of the tractor when the tractor turns. This type of unit is relatively small, and is of restricted load carrying capacity.

The three-axle unit or earth mover is similar to the two axle unit, except that an additional axle is provided on the tractor for steering thereof. As in the two-axle unit, one axle of the tractor (the rear axle) usually provides the only driving force.

In the four-axle unit there is a two-axle trailer which is connected to a two-axle tractor through a draw bar. Usually, driving force is provided only by the rear wheels of the tractor. However, it is known that some of the wheels of a trailer can also be driven, either through appropriate mechanical or electrical connections from the engine of the tractor, or by means of an auxiliary engine on the trailer.

For traction purposes relatively soft tires that will flatten out under load are best when maximum traction is required, as on poor-traction terrain, or on rather substantial uphill grades. However, low-pressure traction tires are incompatible with high pay loads combined with high speeds. High pressure and high capacity are limited by commercially available tires available without special order, which enhances the value of having a multiplicity of tires, as is possible with a separate prime mover and load carrying vehicle for hauling the large loads desired for most economical operation.

It is not particularly difficult, nor is it particularly expensive to install an engine in an earth mover which engine develops more power than can be used at low speeds, traction being the limiting factor. Probably the best means heretofore available for securing improved traction on prime movers whereby to utilize more of the available power is that known in the trade as "weight transfer." Such weight transfer is shown in many of the prior patents of L. R. Simmons, Simmons 2,459,098 being exemplary. In accordance with the weight transfer system, an inclined or semi-vertical hydraulic actuator is mounted at the lower rear part of the tractor and at the upper front part of the trailer. When the actuator is extended, part of the load of the trailer is transferred from the front wheels of the trailer to the wheels of the tractor. This can be to only the rear wheels, or it can be to all four wheels of the tractor when all four wheels thereof are driving wheels in accordance with Simmons Patent 2,899,004. The increased weight on the wheels of the tractor gives much better traction, and hence enhanced load hauling ability. The mere increase in weight on the wheels would be sufficient in itself to increase the traction, since friction is a factor of the coefficient of friction and the normal force urging frictional surfaces together. However, in addition to this, the increased weight causes the tires of the tractor to flatten out rather substantially, thus causing them to conform better to the surface of the terrain, and to provide a better grip thereon.

The weight transfer feature is generally used only at low speeds, and generally on poor-traction terrain or on grades. Once a reasonable speed is obtained on a relatively good road, the weight transfer is abandoned by releasing the pressure in the hydraulic actuator. This avoids continued flattening which would result in rapid wear of the tires on the tractor at high speed.

We have discovered that weight transfer plus drive of one or more trailer axles (in addition to the usual tractor drive) can be combined most advantageously. The result of this combination is rather surprising. One would rather expect that if the two features were to be combined, there would be an arithmetic sum of their effectiveness. In other words, if one were to add weight transfer, a certain improvement in horizontal force transmission between the vehicle and the ground would be attained. Similarly, if one were to add trailer drive to an ordinary tractor drive, a certain improvement in traction would be found. It would be expected that if the two were utilized at the same time, that the two improvements in traction would add together in a simple arithmetic manner. However, this is not the case. In a typical example, the total horizontal tractive force, or draw bar pull is over ten percent greater than the simple sum of the draw bar pull of the tractor with weight transfer plus draw bar pull of trailer drive.

Accordingly, it is an object of this invention to provide a machine for moving earth and the like having improved traction.

More particularly, it is an object of this invention to provide an earth moving machine having four axles and incorporating weight transfer from the trailer to the prime mover and further having in combination therewith drive of at least one trailer axle, the trailer drive and drive of the tractor being from a common power source through mechanical means.

It is furthermore an object of this invention to provide an earth moving machine as set forth above having mechanical means connected to the tractor engine for driving all of the wheels of the trailer.

Other and further objects of the present invention will be apparent from the following description when taken in connection with the accompanying drawings wherein;

FIG. 1 is a side view of an earth moving machine constructed in accordance with the principles of the present invention;

FIG. 2 is a fragmentary side view on an enlarged scale with certain parts broken away to illustrate principles of the invention;

FIG. 3 is a top view corresponding to FIG. 2;

FIG. 4 is a fragmentary side view illustrating a modification of the invention, and;

FIG. 5 is a top view taken substantially along the lines 5—5 in FIG. 4 and with the frame of the machine removed for clarity.

Referring now in greater particularity to the drawings and first to FIGS. 1-3, there is shown an earth moving machine designated generally by the numeral 20 and comprising a tractor 22 and a trailer 24, the trailer in this instance specifically comprising a scraper. The tractor is provided with a front axle having a pair of pneumatic-tired wheels 26 thereon, and with a rear axle having a pair of pneumatic-tired wheels 28 thereon. The tractor, sometimes known as the prime mover, comprises an engine 30 from which the rear wheels 28 are driven, as by the usual drive shaft and differential gears. The differential gears, are preferably of the locking type. In addition, the engine is provided with a chain drive in a chain box 32 driving a longitudinal shaft 34, which is connected by another chain box 36 to a hydraulic pump 38 and a pneumatic pump 40.

The tractor additionally preferably comprises a cab 42 including a roof. Within the cab there is disposed a steering wheel 44, the front wheels 26 of the tractor being steerable. Also within the cab is an operator's seat 46, foot pedal controls 48, and hand lever controls 50.

The trailer or scraper 24 is mostly of conventional construction including a yoke 52 having a gooseneck at the forward end thereof, and having supported at the forward end thereof in conventional fashion a pair of wheels 53. The wheels are rotatable, and also are pivotally or steerably mounted. A bowl 54 is pivotally mounted adjacent the rear wheels at 55, on the opposite sides of the bowl. The bowl is additionally connected to a frame 56. The bowl is provided with the usual scraper blade and with ejecting means preferably comprising a floor and back wall which can be tipped up. This structure is not herein fully disclosed since it is the same as that fully described and claimed in U.S. Patent 2,965,988, issued to James T. Monk and entitled "Scraper."

The bowl is provided at the forward end with hydraulic actuator mechanism 87 operable between the bowl and the upper forward portions of the yoke 52 for lifting the bowl from the scraping position of FIG. 1 to the carrying position of FIG. 2. (It will be observed that the actuating mechanism has been shown only in FIG. 1 to avoid obscuring details of the invention in the other figures.)

The trailer or scraper is connected at the front end by means of a drawbar 88 to the tractor 22. The drawbar may be a straight-through bar or of the A-shaped variety, and it is connected to the steering mechanism (not shown) of the trailer or scraper. At the front end, the drawbar is connected for both vertical or horizontal pivoting in accordance with the usual practice.

In addition to the foregoing, the tractor is hitched to the trailer by means of a hydraulic actuator cylinder arrangement 98 which is connected at its lower end to the rear of the tractor for vertical pivoting of the diagonally disposed actuator. The connection to the tractor also incorporates means for horizontal pivoting of the actuator. Specific details on this need not be described because they are known in the art, and for example, the weight transfer mechanism now being described in brief can be similar to that disclosed in U.S. Patent 2,459,098 issued to Lovel R. Simmons. A similar weight transfer mechanism is shown in U.S. Patent 2,899,004, also issued to Lovel R. Simmons. The upper end of the actuator 98 comprising the piston or ram 106 is connected through a pin and clevis arrangement allowing both vertical and horizontal pivoting. When the ram 106 of the hydraulic actuator 98 is extended, a substantial vertical component of force is developed, which tends to lift the front end of the trailer relative to the rear end of the tractor. Accordingly, a substantial portion of the weight of the trailer is transferred to the rear wheels 28 of the tractor, thereby causing the tires thereon to flatten out to a considerable extent, and to provide better traction. As will be understood the wheels 53 of the trailer generally are not lifted completely from the ground but the front of the trailer is lifted sufficiently that the tires tend to round out from their somewhat flattened condition.

Reference should now be had particularly to FIGS. 2 and 3 wherein the mechanical drive mechanism for the trailer rear wheels is shown. For clarity of illustration certain parts have been omitted, such as the wheels on the near side in FIG. 2 and the ejecting or dumping mechanism. Certain parts of the supporting frame have been omitted from FIG. 3 for clarity. The tractor 22 is provided with a propeller or drive shaft 334 with a pinion 336 thereon driving the ring gear 338 of a differential in order to drive the axle on which the rear tractor wheels 28 are mounted. Preferably, the differential also includes means for locking the differential, but that is not of particular importance at the present time. In addition, the ring gear 228 drives a pinion 340 mounted on the back side thereof and fixed on the shaft 342. This shaft is connected through a power connect-disconnect unit 344 to a stub shaft 346. The unit 344 may, for example, be a clutch which is mechanically or hydraulically controlled from the cab, as by a pedal or a lever readily accessible to the operator.

The stub shaft 346 carries a bevel gear 348 which meshes with a bevel gear 350 pivotally mounted about a common axis with the horizontal pivot of the weight transfer mechanism linkage 98 and with the horizontal pivot of the drawbar 88. The bevel gear 350 meshes with and drives a bevel gear 352 fixed on a shaft 354 including a number of universal joints to drive a bevel gear 356. The bevel gear 356 meshes with a bevel gear 358 coaxial with the steering axis of the front wheels 53 of the trailer or scraper 24. The bevel gear 358 is fixed on a vertical shaft 360 having a bevel gear 362 at the top thereof meshing with a bevel gear 364. The bevel gear 364 is connected through a universal joint 366 to a shaft length 368 leading rearwardly and downwardly, as well as off to one side along the frame member 52. The shaft length 368 is connected through additional universal joints and shaft lengths, lumped together under the numeral 370, to a bevel gear 372 at the top rear center of the machine. This bevel gear meshes with a bevel gear 374 mounted on a semi-vertical shaft 376. This shaft drives a torque limiting device 378 which acts through a universal joint drive a speed reducer 380. The speed reducer acts through a power connect-disconnect unit 382 to drive a bevel gear or pinion 384. The unit 382 is similar to the unit 344, and may be operated at the same time by a hydraulic or pneumatic throw-out system. The pinion 384 drives the ring gear 386 of a differential driving the rear wheels 132 of the trailer or scraper. Preferably, the differential is a locking type differential.

It will now be apparent, as long as the power connect-disconnect unit 344 and 382 are in connect position, the rear wheels 132 of the trailer are driven at the same speed as the rear wheels 28 of the tractor. No problems of synchronously shifting gears or the like are involved, since both sets of wheels are driven through the tractor transmission from the tractor engine. Once the vehicle has come up to speed, the power connect-disconnect units are shifted to the non-driving or disconnect position, so that the trailer is simply towed by the tractor. Preferably, means is provided whereby the weight transfer mechanism is actuated simultaneously with the power connect-disconnect units.

Certain advantages can be obtained by driving the front wheels of the trailer, as well as the rear wheels, and mechanism for this purpose is disclosed in FIGS. 4 and 5. The apparatus in these two figures is substantially identical with that in FIGS. 2 and 3, and similar numerals are used with the addition of the suffix c. The essential difference in the present form of the invention is that the vertical shaft 360c at the front of the trailer has a worm 388 thereon. A clutch mechanism 390 is provided for selectively locking the worm to the shaft 360c for rotation therewith, or for idling thereon. The clutch mechanism desirably is controlled by a hydraulic or pneumatic connection from the cab of the tractor. The worm 388 drives a worm gear 392 on an offset cross-shaft having a pair of pinions 394 thereon which respectively drive gears 396 on the half axles supporting and driving the wheels 53c of the trailer or scraper. As will be apparent, the clutch mechanism 390 may be connected to operate concurrently with the weight transfer and rear axle drive, if so desired. However, preferably the front wheel drive, as controlled by the clutch 390, is independently controlled, as will be brought out hereinafter in connection with a description of the operational advantages of front wheel drive.

In a typical earth moving machine constructed in accordance with the principles of this invention, the following weight distribution is obtained with the use of the weight transfer feature:

EMPTY

|  | Prime Mover | | Trailer | | Total Weight | Percent |
|---|---|---|---|---|---|---|
|  | Front Axle | Rear Axle | Front Axle | Rear Axle | | |
| Percentage | 10.45 | 36.58 | 26.48 | 26.48 | | 100 |
| No Weight Transfer | 15,000 | 52,500 | 38,000 | 38,000 | 143,500 | |
| Percentage | 10.45 | 50.52 | 4.60 | 34.42 | | 100 |
| With Weight Transfer | 15,000 | 72,500 | 6,600 | 49,400 | 143,500 | |

LOADED

|  | Prime Mover | | Trailer | | Total Weight | Percent |
|---|---|---|---|---|---|---|
|  | Front Axle | Rear Axle | Front Axle | Rear Axle | | |
| Percentage | 5.74 | 20.11 | 33.43 | 40.71 | | 100 |
| No Weight Transfer | 15,000 | 52,500 | 87,300 | 106,300 | 261,100 | |
| Percentage | 5.74 | 37.70 | 5.81 | 50.74 | | 100 |
| With Weight Transfer | 15,000 | 98,446 | 15,164 | 132,490 | 261,100 | |

With the vehicle empty, and with no weight transfer, but with both the rear tractor and trailer wheels driving, it has been found that the draw bar pull of the tractor will amount to 28,875 pounds. The equivalent horizontal force, which for convenience will also be referred to as draw bar pull of the trailer amounts to 20,900 pounds. This gives a total draw bar pull of 49,775 pounds. In arriving at these figures, it must be borne in mind that sufficient horse power is provided for maximum tractive effort. The limiting factor is the gripping of the ground by the tires. It has been found that with an empty vehicle, the tractive coefficient of the tires will typically be .55 for both the trailer and for the tractor. The term "tractive coefficient" is used, since the factor involved is not truly a coefficient of friction, inasmuch as the tires flatten out to a certain extent to conform with the ground or terrain, thereby providing a gripping action in addition to friction.

Now when weight transfer is used, the rear wheels of the tractor are flattened out to a rather considerable extent, increasing the tractive coefficient to .74. At the same time, the load on the tractor rear wheels, with the trailer empty, is increased to 72,500 pounds. A draw bar pull of 53,650 pounds thus is produced by the tractor. A simple addition of this 53,650 pounds and the previous draw bar pull of the trailer of 20,900 pounds would provide a total of only 74,550 pounds. However, with the combination of weight transfer and drive of the rear trailer wheels, the total draw bar pull or tractive force is actually 80,820 pounds, nearly ten percent greater than that which would be initially expected. This is due to the fact that the weight transfer also shifts a certain amount of the weight of the trailer from the front wheels to the rear wheels of the trailer. In fact, in accordance with the table above, the weight on the rear wheels of the trailer becomes 49,400 pounds. Combined with the previously mentioned tractive coefficient of .55, the draw bar pull of the rear wheels of the trailer is 27,170 pounds, an increase of 6,270 pounds over the tractive power of the trailer without weight transfer.

The improvement is even more marked with a loaded vehicle. With the loaded vehicle, and with no weight transfer but with the rear tractor wheels and the rear trailer wheels driving, the rear tractor wheels again provide a draw bar pull or tractive force of 28,875 pounds. However, since the rear wheels of the trailer now have 106,300 pounds on them, the trailer produces a draw bar pull or tractive force of 58,465 pounds. Thus, the total tractive force is 87,340 pounds.

With weight transfer, the tractive coefficient of the tractor rear wheels again becomes .74, which times the 98,446 pound weight now on the rear tractor wheels produces a tractive effort or draw bar pull of 72,850 pounds. If the trailer tractive effort remains at 58,465 pounds as before weight transfer, the total tractive effort would be 131,315 pounds. However, since a part of the weight of the front wheels of the trailer is again transferred to the rear wheels, the trailer exerts a tractive force or draw bar pull of 72,869 pounds, thus producing a total tractive effort of the combination of 145,719 pounds. This produces an improvement of 14,404 pounds over the arithmetic sum of rear trailer wheel drive and tractor drive with weight transfer, over ten percent.

Thus, it will be seen that the combination of weight transfer and rear axle trailer drive produces more than a simple sum of the benefits of each.

It is appreciated that the coefficient of friction is determined by the nature of two contacting materials, and that at least theoretically the coefficient of friction is independent of the area of force. However, the tractive coefficient as used herein is not so limited. This is because the increased weight on the rear wheels of the tractor causes the tires to flatten out to a rather marked extent, thereby gripping the surface of the ground or terrain. Under adverse conditions, the very time when increased traction is desired, the surface of the terrain is apt to be quite irregular, hence providing better opportunity for gripping by the flattened out tires. A common example of this effect which is known to almost everyone is that when an automobile is stuck in sand, or sometimes on ice or in snow, it often can be driven away simply by letting a substantial amount of air out of the rear tires. Since weight transfer greatly reduces the weight on the front wheels of the trailer, a superficial approach might well question the advantages of the combination of four-wheel trailer drive with weight transfer. It is believed that all that is necessary to support the advantage of this combination is to point out that the different wheels of the combination may at any given time encounter different tractive conditions. For most circumstances, the combination of weight transfer and rear wheel trailer drive is excellent. However, it will be appreciated that there are circumstances in which little or no tractive effort could be applied by either the rear tractor wheels or the rear trailer wheels, should these wheels be in slick spots resulting from mud, ice, or the like, while the front trailer wheels might at the same time be on material of relatively good traction. In this instance, it is most desirable that the front trailer wheels be able to exert a tractive force. Of course, under such circumstances the weight transfer feature would be deenergized in order to leave as much weight as possible on the front wheels of the trailer.

It has been observed heretofore that it is desirable to deenergize the weight transfer means, while still utilizing trailer drive. For example, when making a sharp turn of such nature that the tractor is at 90° to the trailer, energization of the weight transfer means has a tendency to tip the trailer. Obviously, under such circumstances it is desirable that the weight transfer feature be deenergized.

It is desired that the weight transfer system be switched out or deenergized at high speeds for at least two reasons. Although soft low-pressure tires can carry a rather substantial load at low speeds, if the weight transfer feature were utilized at high speeds terrific overloads would be imposed on the tractor drive tires, resulting in quick destruction of these tires. The soft low-pressure tires can be used on the tractor or prime mover since weight transfer is used only at low speeds, and since the tires have to carry only relatively low weight at higher speeds.

In addition, once the earth mover or the like has reached a speed where maximum traction and draw bar pull are no longer needed, it is undesirable to continue the weight transfer since the large portion of the trailed loads supported on top of the prime mover or tractor would result in great pounding and surging action on the tractor at high speeds, leading to short service life.

It will be understood that the specific examples of the invention as herein shown and described are for purposes of illustration only. Various changes in structure will no doubt occur to those skilled in the art and will be understood as coming within the ambit of the present invention insofar as they fall within the spirit and scope of the appended claims.

This invention is claimed as follows:

1. A machine for moving earth and the like comprising a tractor having drive wheels, a power source and means for driving said drive wheels from said power source to enable said tractor to develop a first drawbar force, means providing an operator's station on said tractor, a trailer having front and rear wheels, and power means on said trailer comprising mechanical drive means drivingly connected to at least said trailer rear wheels to enable said trailer to develop a second drawbar force, said trailer having a gooseneck frame, power coupling means interconnecting said tractor power source and said trailer power means for driving at least said trailer rear wheels from said tractor power source, draft means interconnecting the bottom of the gooseneck frame of said trailer and said tractor for pulling of said trailer by said tractor, said power coupling means running along said draft means, said trailer mechanical drive means running up and over said gooseneck frame, means interconnecting the rear of said tractor and the front of said trailer and operative to transfer at least a part of the weight of said trailer from said front to said rear wheels thereof and to said drive wheels of said tractor, and control means at said operator's station on said tractor operatively connected to said weight transfer means and to said trailer power means for selectively operating both thereof, whereby the operation together of said weight transfer means and said power means of said trailer with said power source of said tractor enables said earth moving machine to develop a third drawbar force greater than the sum of said first and said second drawbar forces, thereby permitting said machine to traverse terrain which provides inherently low traction.

2. A machine as set forth in claim 1 wherein said tractor power source includes an engine adjacent the front thereof and the means for driving the tractor wheels includes a drive shaft extending from adjacent said engine and driven thereby to a position adjacent the tractor rear wheels, and wherein the power coupling means is connected to said drive shaft and driven thereby.

3. A machine as set forth in claim 2 wherein the tractor driving means further includes a differential driven by said drive shaft and driving said rear wheels, and further including a gear meshing with said differential and driving said power coupling means.

4. A machine as set forth in claim 1 and further including means for selectively connecting and disconnecting said trailer power means to at least said trailer rear wheels.

5. A machine as set forth in claim 4 and further including means for selectively connecting said trailer power means to said trailer front wheels selectively to drive said trailer front wheels.

References Cited by the Examiner

UNITED STATES PATENTS

| 1,787,213 | 12/1930 | Salomonsen | 180—14 |
| 2,158,320 | 5/1939 | Bock | |
| 2,194,811 | 3/1940 | Rice | 180—14 |
| 2,459,098 | 1/1949 | Simmons | 280—461 X |
| 2,875,644 | 3/1959 | Mancini | 180—14 X |
| 2,903,080 | 9/1959 | Ritter | 180—14 |

FOREIGN PATENTS

| 168,153 | 4/1951 | Austria. |

BENJAMIN HERSH, *Primary Examiner.*

A. HARRY LEVY, *Examiner.*